United States Patent
Silva et al.

(10) Patent No.: US 11,410,781 B2
(45) Date of Patent: Aug. 9, 2022

(54) INTERNET OF THINGS HUB FOR ENABLING MOBILITY WITHIN A MANUFACTURING ENVIRONMENT

(71) Applicant: Dell Products L.P., Round Rock, TX (US)

(72) Inventors: William Silva, Hortolandia (BR); Fabricio M. Takaki, Valinhos (BR)

(73) Assignee: Dell Products L.P., Round Rock, TX (US)

( * ) Notice: Subject to any disclaimer, the term of this patent is extended or adjusted under 35 U.S.C. 154(b) by 295 days.

(21) Appl. No.: 16/834,784

(22) Filed: Mar. 30, 2020

(65) Prior Publication Data

US 2021/0304903 A1  Sep. 30, 2021

(51) Int. Cl.
*G16Y 10/25* (2020.01)
*G16Y 20/10* (2020.01)
*H04W 4/80* (2018.01)
*G16Y 40/10* (2020.01)
*H04W 84/18* (2009.01)
*G16Y 40/35* (2020.01)

(52) U.S. Cl.
CPC .............. *G16Y 10/25* (2020.01); *G16Y 20/10* (2020.01); *G16Y 40/10* (2020.01); *G16Y 40/35* (2020.01); *H04W 4/80* (2018.02); *H04W 84/18* (2013.01)

(58) Field of Classification Search
None
See application file for complete search history.

(56) References Cited

U.S. PATENT DOCUMENTS

| | | | |
|---|---|---|---|
| 11,004,128 B1* | 5/2021 | Mishra | G06Q 30/0631 |
| 2015/0334554 A1* | 11/2015 | Song | H04W 12/06 455/558 |
| 2017/0063968 A1* | 3/2017 | Kitchen | H04L 67/02 |

* cited by examiner

*Primary Examiner* — Walter J Divito
(74) *Attorney, Agent, or Firm* — Terrile, Cannatti & Chambers; Stephen A. Terrile

(57) ABSTRACT

A system, method, and computer-readable medium are disclosed for managing a manufacturing environment, comprising: providing an Internet of Things (IoT) hub, the IoT hub coordinating communication between a mobile device and a product fabrication system; communicating between the mobile device and the product fabrication system via a secure internal network of the manufacturing environment; maintaining a master version of an application on the IoT hub; and, updating a mobile version of an application on the mobile device using the master version of the application maintained on the IoT hub.

17 Claims, 3 Drawing Sheets

INTERNET OF THINGS HUB FOR ENABLING MOBILITY WITHIN A MANUFACTURING ENVIRONMENT

BACKGROUND OF THE INVENTION

Field of the Invention

The present invention relates to information handling systems. More specifically, embodiments of the invention relate to managing mobile device applications in a manufacturing environment.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment the invention relates to for managing a manufacturing environment, comprising: providing an Internet of Things (IoT) hub, the IoT hub coordinating communication between a mobile device and a product fabrication system; communicating between the mobile device and the product fabrication system via a secure internal network of the manufacturing environment; maintaining a master version of an application on the IoT hub; and, updating a mobile version of an application on the mobile device using the master version of the application maintained on the IoT hub.

In another embodiment the invention relates to a system comprising: a processor; a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for: providing an Internet of Things (IoT) hub, the IoT hub coordinating communication between a mobile device and a product fabrication system; communicating between the mobile device and the product fabrication system via a secure internal network of the manufacturing environment; maintaining a master version of an application on the IoT hub; and, updating a mobile version of an application on the mobile device using the master version of the application maintained on the IoT hub.

In another embodiment the invention relates to a computer-readable storage medium embodying computer program code, the computer program code comprising computer executable instructions configured for: providing an Internet of Things (IoT) hub, the IoT hub coordinating communication between a mobile device and a product fabrication system; communicating between the mobile device and the product fabrication system via a secure internal network of the manufacturing environment; maintaining a master version of an application on the IoT hub; and, updating a mobile version of an application on the mobile device using the master version of the application maintained on the IoT hub.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A system, method, and computer-readable medium are disclosed for managing mobile device applications in a manufacturing environment. Certain aspects of the invention reflect an appreciation that the use of mobile device applications, described in greater detail herein, are commonly used to improve productivity in a manufacturing environment, likewise described in greater detail herein. Certain aspects of the invention likewise reflect an appreciation that such productivity may include shortened cycle times, improved monitoring of manufacturing operations and processes, decreased reliance on staff for analysis, action-oriented decision support, reduced walking times for operators, and so forth. Likewise, certain aspects of the invention reflect an appreciation that current approaches to updating mobile device applications typically involve updating individual mobile devices one by one. In addition, certain aspects of the invention reflect an appreciation that individual updates of the same mobile device application on multiple mobile devices may introduce version synchronization and cross-platform functionality issues.

Certain aspects of the invention likewise reflect an appreciation that it is not uncommon for organizations to implement a web portal for distribution of content and applications. However, certain aspects of the invention reflect an appreciation that such web portal approaches are often used to simply group together a collection of content and applications. Likewise, certain aspects of the invention reflect an appreciation that current approaches to providing mobile device applications typically follow the same model, and by extension, result in realization of the same issues.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
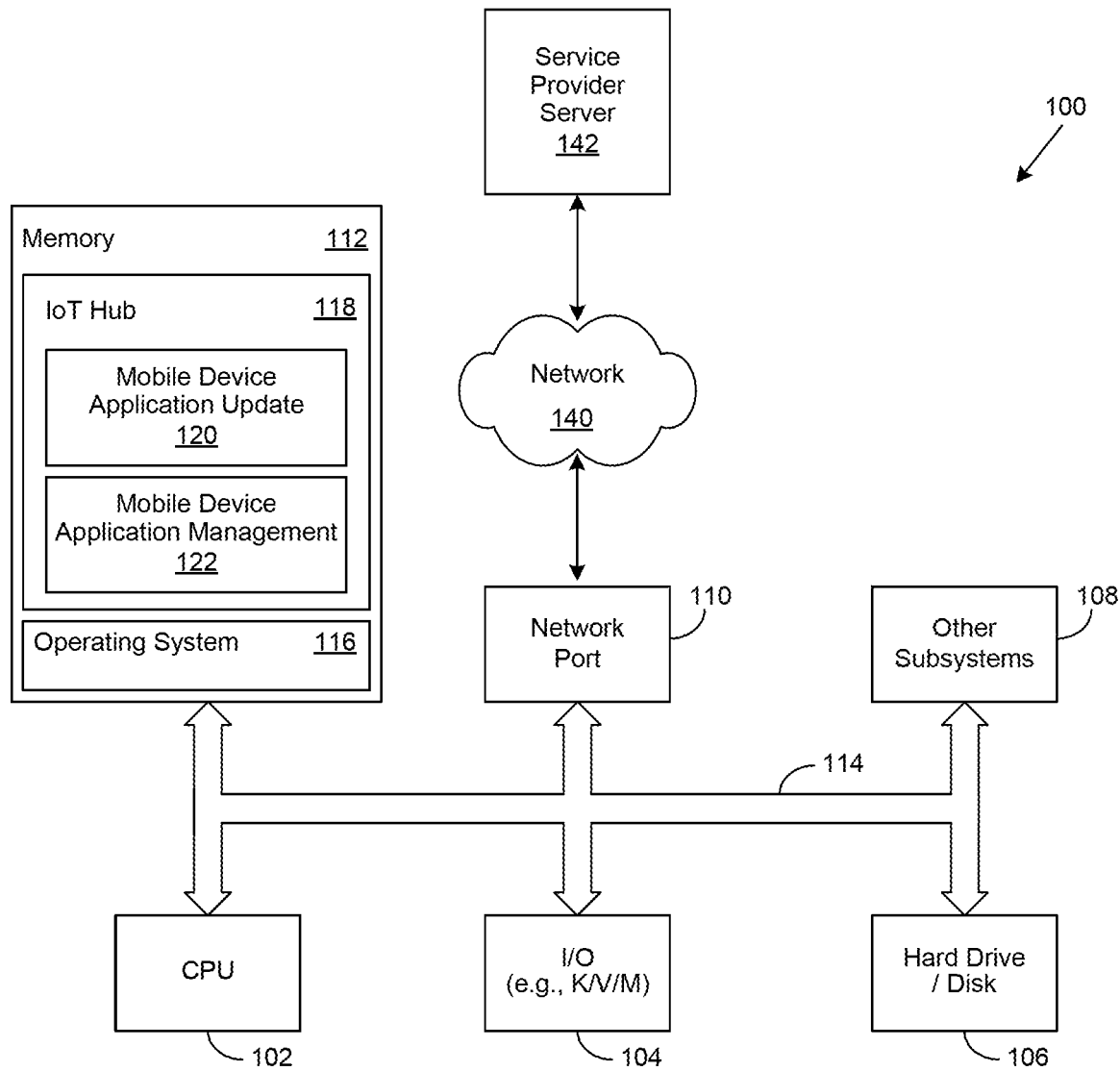
FIG. 1 shows a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, a touchpad or touchscreen, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise an Internet of Things (IoT) hub. In certain embodiments, the information handling system 100 may be implemented to download the IoT hub 118 from the service provider server 142.

In certain embodiments, the IoT hub 118 may be provided as a service from the service provider server 142. In certain embodiments, the IoT hub 118 may be implemented to include a mobile device application update 120 module, or a mobile device application management 122 module, or both. In certain embodiments, the IoT hub 118 may be implemented to perform a mobile device application management operation. In certain embodiments, the mobile device application management operation may be performed in a manufacturing environment, described in greater detail herein, during operation of an information handling system 100.

Figure 2:
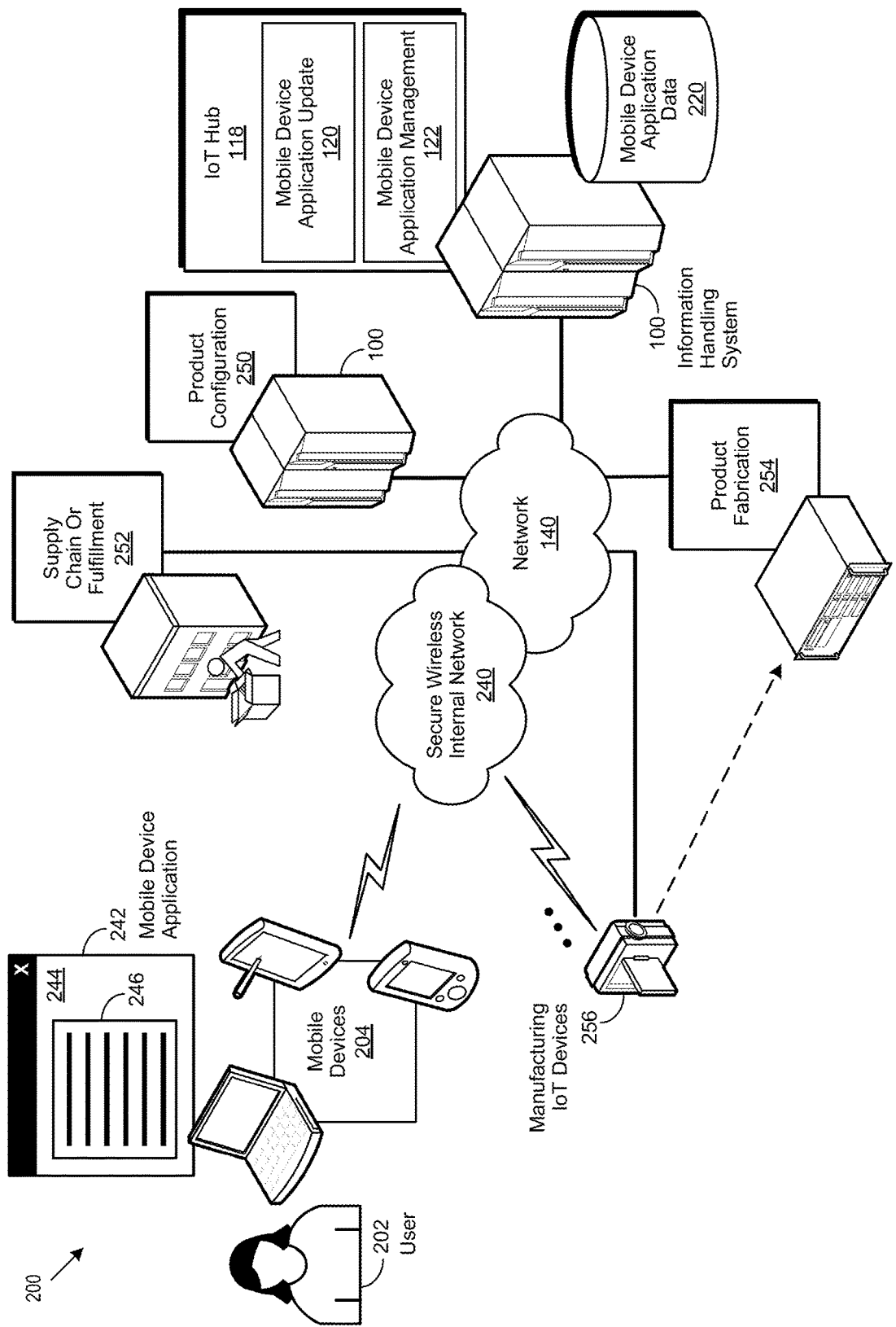
FIG. 2 shows a block diagram of a manufacturing environment.

FIG. 2 shows a block diagram of a manufacturing environment implemented in accordance with an embodiment of the invention. In certain embodiments, the manufacturing environment 200 may include an Internet of Things (IoT) hub 118. As used herein, the Internet of Things (IoT) broadly refers to an inter-networking of things or objects, generally referred to as IoT devices, that promote the collection and exchange of data among those objects. Generally speaking, IoT technology allows IoT devices to operate remotely across a network infrastructure, described in greater detail herein, to integrate the physical world into computer-based systems using a variety of different communication protocols. In certain embodiments, the manufacturing environment 200 may include a repository of mobile device application data 220. In certain embodiments, the repository of mobile device application data 220 may be local to the information handling system 100 executing the IoT Hub 118 or may be accessed remotely.

In certain embodiments, the IoT hub 118 may include a mobile device application update 120 module, or a mobile device application management 122 module, or both. In certain embodiments, the IoT hub 118 may be implemented as a hub-to-bridge server for web-based applications. In various embodiments, the IoT hub 118 may be implemented to perform certain operations associated with managing a mobile device 204 in a manufacturing environment 200. In certain embodiments, the mobile device application update 120 module may be implemented to receive a master version, and revisions thereto, of a mobile device application 242. In certain embodiments, the master version of a mobile device application 242, and revisions thereto, may be stored in the repository of mobile device application data 220.

In various embodiments, the mobile device application management 122 module may be implemented to manage the provision of certain mobile device applications 242 for use by a particular mobile device 204. As used herein, a mobile device 204 broadly refers to a portable information handling system such as a personal computer, a laptop computer, a tablet computer, a personal digital assistant (PDA), a smart phone, a mobile telephone, or other device capable of processing and wirelessly communicating data. In various embodiments, the IoT hub 118 may be implemented to use one or more networks 140, such as a secure wireless internal network 240 to provide certain mobile device applications 242 for use by a particular mobile device 204.

In various embodiments, the network 140 may be a public network 140, such as the Internet, a physical private network 140, a secure wireless internal network 240, a virtual private network (VPN) 140, or any combination thereof. In certain embodiments, the combination of the mobile device 204 and the secure wireless internal network 240, by itself, or in combination with a particular network 140, may be implemented as a mobile communications environment within the manufacturing environment 200. In certain embodiments, the secure wireless internal network 240 may include a personal area network (PAN), based on technologies such as Bluetooth or Ultra Wideband (UWB). In certain embodiments, the secure wireless internal network 240 may include a wireless local area network (WLAN), based on variations of the IEEE 802.11 specification, often referred to as WiFi.

In certain embodiments, the secure wireless internal network 240 may include a wireless wide area network (WWAN) based on an industry standard including two and a half generation (2.5G) wireless technologies such as global system for mobile communications (GPRS) and enhanced data rates for GSM evolution (EDGE). In certain embodiments, the secure wireless internal network 240 may include WWANs based on existing third generation (3G) wireless technologies including universal mobile telecommunications system (UMTS) and wideband code division multiple access (W-CDMA). In certain embodiments, the secure wireless internal network 240 may include the implementation of other 3G technologies, including evolution-data optimized (EVDO), IEEE 802.16 (WiMAX), wireless broadband (WiBro), high-speed downlink packet access (ESDPA), high-speed uplink packet access (HSUPA), and emerging fourth generation (4G) and fifth generation (5G) wireless technologies. Skilled practitioners of the art will realize that many such embodiments are possible and the foregoing is not intended to limit the spirit, scope or intent of the invention.

In certain embodiments, the provision of a mobile device application 242 to a particular mobile device 204 may include an initial provision of the mobile device application 242. In various embodiments, the provision of a mobile device application 242 to a particular mobile device 204 may include the provision of a certain version of the mobile device application 242. In certain embodiments, the provision of a mobile device application 242 to a particular mobile device 204 may include the provision of an updated version of the mobile device application 242. In certain embodiments, the provision of a mobile device application 242 to a particular mobile device 204 may include the provision of a previous version of the mobile device application 242.

One example of a mobile device application 242 is a burn assistant, which may be used to monitor burn-in processes associated with certain electronic equipment. In this example, a user 202 can use a mobile device 204 to access the burn assistant mobile device application 242 stored on the IoT hub 118 as they roam through burn-in racks of equipment. Another example of a mobile device application 242 is a setup map, which may be used to provide a list of components for a particular product being fabricated. In this example, a user can use a mobile device 204 to access the setup map mobile device application 242 stored on the IoT hub 118 to obtain a list of needed components as they access inventory.

Yet another example of a mobile device application 242 is quality audit, which may be used to follow work instructions step by step. In this example, the user 202 can use a mobile device 204 to access the quality audit map mobile device application 242, which provides the work instructions to the mobile device 204, thereby eliminating the need to print a hard copy of the work instructions. Yet still another example of a mobile device application 242 is material handover, which is used to transfer manufacturing material and components from a warehouse to the manufacturing floor. In this example, the user 202 can use a mobile device 204 to access the material handover mobile device application 242 to track materials lists, quantities, and receiving box barcodes. Skilled practitioners of the art will recognize that many such examples of a mobile device application 242 are possible. Accordingly, the foregoing is not intended to limit the spirit, scope, or intent of the invention.

In various embodiments, certain mobile device applications 242 may be implemented as a progressive web application (PWA). Skilled practitioners of the art will be familiar with a PWA, which broadly refers to application software designed to work on any platform that uses a standards-compliant browser. Typical PWA development approaches use common web technologies such as hypertext markup language (HTML), cascading style sheets (CSS), and JavaScript. Those of skill in the art will likewise be aware that PWA functionalities include receiving push notifications and access to device hardware, such as that used in a mobile device 204. Other PWA functionalities include the ability to create a user experience similar to native applications on desktop computers and mobile devices 204.

Certain embodiments of the invention reflect an appreciation that a PWA is a type of webpage, commonly referred to as a web application. As used herein, a webpage broadly refers to a document accessible via a browser, which displays the webpage via a display device of an information handling system 100, such as a mobile device 204. In certain embodiments, the webpage may also include the file which causes the document to be presented via the browser. In various embodiments, the webpage may comprise a static web page, which is delivered exactly as stored and a dynamic webpage, which is generated by a web application that is driven by software that enhances the webpage via user 202 input.

Certain embodiments of the invention likewise reflect an appreciation that a PWA does not require separate bundling or distribution. Instead, publication of a PWA is as it would be for any other webpage. Accordingly, certain embodiments of the invention reflect an appreciation that changes to a particular PWA are uniformly available to any mobile device 204 authorized to receive it. In various embodiments, the mobile device application management 122 module may be implemented to perform certain PWA versioning operations to manage the versioning of a particular mobile device application 242. In certain embodiments, the versioning of a PWA-based mobile device application 242 may be managed by publishing new, or revising one or more existing, PWA webpages.

In certain embodiments, the mobile device application management 122 module may be implemented to manage permissions associated with the use of a certain mobile device applications 242 by a particular mobile device 204, or user 202, or combination thereof. As used herein, permissions broadly refers one or more parameters used to define what a particular user 202 is allowed to do with a particular mobile device 204 executing a particular mobile device application 242. In various embodiments, permissions may be implemented in the context of role based access control.

In general, role based access control is based upon three interrelated concepts. The first of these, role, relates to a particular user's 202 job function, title, access rights, authority level, and so forth. The second is permissions, which describes the ability, and associated limits, to view or modify a particular class, or individual, functionality. The third is operation, which refers to a particular action that may be performed, individually or in combination, in a manufacturing environment 200. In certain embodiments, performance of a particular operation may require one or more permissions. In certain embodiments, such permissions may be stored in the repository of mobile device application data 220.

In various embodiments, the mobile device application management 122 module may be implemented to grant permission to use a particular version of a mobile device application according to certain identity factors associated with a user 202, or one or more unique identifiers associated with a mobile device 204, or a combination thereof. In certain embodiments, identity factors associated with a particular user 202 may include a user ID, a password, personal identification number, one or more cryptographic keys, a biometric, tokens, or a combination thereof.

In certain embodiments, unique identifiers associated with a particular mobile device 204 may include the device's AndroidID, its MachineName, its associated International Mobile Equipment Identity (IMEI) number, its Electronic Serial Number (ESN), its Media Access Control (MAC) address, an associated Subscriber Information Module (SIM) card, one or more associated cryptographic keys, or a combination thereof. In certain embodiments, identity factors associated with a particular user 202 and unique identifiers associated with a particular mobile device 204 may be stored in the repository of mobile device application data 220.

In various embodiments, the mobile device 204 may be implemented to execute within a parental control application (PCA). As used herein, a parental control broadly refers to any functionality that restricts, or otherwise manages, access to certain digital content. In typical implementations, parental controls may include content filters, usage controls, computer management functionalities, and monitoring capabilities, or a combination thereof.

In general, content filters limit access to certain content, such as a mobile device application 242, according to certain parameters, such as the identity factors associated with a user 202, or unique identifiers associated with a mobile device 204, or a combination thereof. Likewise, usage controls typically constrain the usage of a particular device, such as a mobile device 204, or certain content, such as a mobile device application 242, by placing time limits on usage, or forbidding certain types of usage, or a combination thereof. Computer management functionalities are likewise typically implemented to enforce the use of certain software, such as the mobile device application 242, or the manner in which it is used. Likewise, monitoring capabilities are typically implemented to track location and associated activities when using a particular device, such as a mobile device 204. In certain embodiments, a PCA may be implemented on a mobile device 204 to limit its access to content to that provided by the IoT hub 118.

In certain embodiments, the mobile device 204 may be configured to present a user interface (UI) 244 associated with a particular mobile device application 242. In certain embodiments, the UI 244 may be implemented to present a graphical representation 246 of information associated with the execution of certain mobile device application 242 functionalities or operations, described in greater detail herein. In certain embodiments, the graphical representation 246 may be automatically generated in response to interaction with the IoT hub 118.

In certain embodiments, the user device 204 may be implemented to exchange information between the user 202 and the IoT hub 118, a product configuration system 250, a supply chain or fulfillment system 252, a product fabrication system 254, one or more manufacturing IoT devices 256, or a combination thereof. As described in greater detail herein, the exchange of such sensor-oriented information may be accomplished in certain embodiments through the use of the secure wireless internal network 240, independently or in combination with, another network 140. As used herein, an IoT device broadly refers to any device capable of using an Internet-oriented communications protocol to send and receive data corresponding to an associated sensor. Examples of consumer IoT devices include smart TVs, smart speakers, smart appliance, smart thermostats, wearables, and so forth. Examples of industrial IoT devices include smart meters, commercial security systems, and various smart city technologies, such as those used to monitor traffic and weather conditions.

As likewise used herein, a manufacturing IoT device 256 broadly refers to any IoT device used within a manufacturing environment 200 used in the performance of a manufacturing activity, operation, or process. Such activities, operations, or processes may be used in process automation (e.g., chemicals, food, beverage, pharmaceuticals), discrete automation (e.g., automobiles, machine, electronics), and industrial fabrication of all kinds. Other manufacturing-related activities, operations, or processes include predictive maintenance, process or quality control, fleet management, supply chain and inventory management, remote asset management, security and access control, energy management, compliance, and safety, among many others. Examples of manufacturing IoT devices 256 include wireless sensors, actuators, instrumentation of various sorts, computer numeric controlled (CN) machines, manufacturing and fulfillment robots, and so forth. In various embodiments, one or more manufacturing IoT devices 256 may be implemented to monitor, control, or otherwise interact with certain aspects of a product fabrication system 254.

In certain embodiments, the IoT hub 118 may be implemented to interact with the product configuration system 250, the supply chain or fulfillment system 252, the product fabrication system 254, one or more manufacturing IoT devices 256, or a combination thereof. In certain embodiments, the product configuration system 250, the supply chain or fulfillment system 252, and the product fabrication system 254 may be executing on separate information handling systems 100. In certain embodiments, the product configuration system 250 may be implemented to interact with the product fabrication system 254. In various embodiments, the product fabrication system 254 may be implemented to interact with one or more manufacturing IoT devices 256. In various embodiments, such interactions may be used by the product fabrication system 254 in the performance of certain fabrication activities, operations, or processes.

Figure 3:
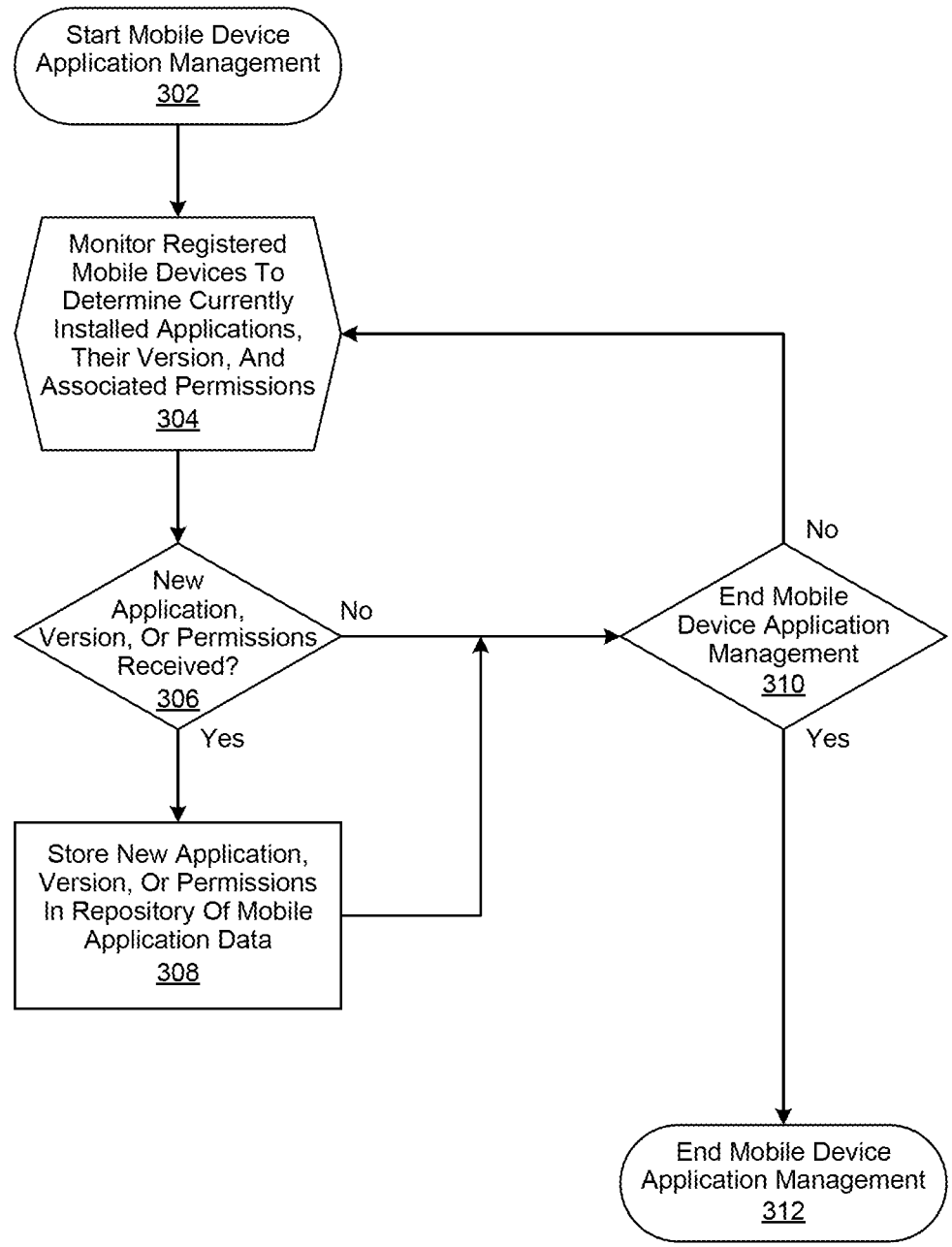
FIG. 3 shows a flow chart of automated mobile application management operations.

FIG. 3 shows a flow chart of automated mobile application management operations implemented in accordance with an embodiment of the invention. In this embodiment, mobile device application management operations are begun in step 302, followed by ongoing operations being performed in step 304 to monitor registered mobile devices to determine currently installed mobile device applications, their version, and associated permissions, as described in greater detail herein. A determination is then made in step 306 whether a new mobile device application, or a version thereof, or associated permissions, have been received. If so, then the new mobile device application, or a version thereof, or associated permissions, is stored in a repository of mobile device application data in step 308. Thereafter, or if it was determined in step 308 that a new mobile device application, or a version thereof, or associated permissions had not been received, then a determination is made in step 310 whether to end mobile device application management operations. If not, then the process is continued, proceeding with step 304. Otherwise, mobile device application management operations are ended in step 312.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for managing a manufacturing environment, comprising:
   providing an Internet of Things (IoT) hub, the IoT hub coordinating communication between a mobile device and a product fabrication system;
   communicating between the mobile device and the product fabrication system via a secure internal network of the manufacturing environment;
   maintaining a master version of an application on the IoT hub; and,
   updating a mobile version of an application on the mobile device using the master version of the application maintained on the IoT hub; and wherein
   the mobile application comprises a progressive web application; and,
   the progressive web application is provided to the mobile device via the IoT hub.

2. The method of claim 1, wherein:
   the updating the mobile version of the application is via the secure internal network of the manufacturing environment.

3. The method of claim 1, wherein:
   the updating comprises checking with a mobile device identifier and only an application that is registered to the mobile device corresponding to the mobile device identifier is provided to the mobile device as a progressive web application via the IoT hub.

4. The method of claim 3, wherein:
   the mobile device identifier is maintained within a mobile application data repository.

5. The method of claim 1, wherein:
   the mobile device executes within a parent control application, the parent control application assuring that the application is the only application accessible via the mobile device.

6. A system comprising:
   a processor;
   a data bus coupled to the processor; and
   a non-transitory, computer-readable storage medium embodying computer program code, the non-transitory, computer-readable storage medium being coupled to the data bus, the computer program code interacting with a plurality of computer operations and comprising instructions executable by the processor and configured for:
   providing an Internet of Things (IoT) hub, the IoT hub coordinating communication between a mobile device and a product fabrication system;
   communicating between the mobile device and the product fabrication system via a secure internal network of the manufacturing environment;
   maintaining a master version of an application on the IoT hub; and,
   updating a mobile version of an application on the mobile device using the master version of the application maintained on the IoT hub; and wherein
   the mobile application comprises a progressive web application; and,
   the progressive web application is provided to the mobile device via the IoT hub.

7. The system of claim 6, wherein:
the updating the mobile version of the application is via the secure internal network of the manufacturing environment.

8. The system of claim 6, wherein:
the updating comprises checking with a mobile device identifier and only an application that is registered to the mobile device corresponding to the mobile device identifier is provided to the mobile device as a progressive web application via the IoT hub.

9. The system of claim 8, wherein:
the mobile device identifier is maintained within a mobile application data repository.

10. The system of claim 6, wherein:
the mobile device executes within a parent control application, the parent control application assuring that the application is the only application accessible via the mobile device.

11. A non-transitory, computer-readable storage medium embodying computer program code, the computer program code comprising computer executable instructions configured for:
providing an Internet of Things (IoT) hub, the IoT hub coordinating communication between a mobile device and a product fabrication system;
communicating between the mobile device and the product fabrication system via a secure internal network of the manufacturing environment;
maintaining a master version of an application on the IoT hub; and,
updating a mobile version of an application on the mobile device using the master version of the application maintained on the IoT hub; and wherein
the mobile application comprises a progressive web application; and,
the progressive web application is provided to the mobile device via the IoT hub.

12. The non-transitory, computer-readable storage medium of claim 11, wherein:
the updating the mobile version of the application is via the secure internal network of the manufacturing environment.

13. The non-transitory, computer-readable storage medium of claim 11, wherein:
the updating comprises checking with a mobile device identifier and only an application that is registered to the mobile device corresponding to the mobile device identifier is provided to the mobile device as a progressive web application via the IoT hub.

14. The non-transitory, computer-readable storage medium of claim 13, wherein:
the mobile device identifier is maintained within a mobile application data repository.

15. The non-transitory, computer-readable storage medium of claim 11, wherein:
the mobile device executes within a parent control application, the parent control application assuring that the application is the only application accessible via the mobile device.

16. The non-transitory, computer-readable storage medium of claim 11, wherein:
the computer executable instructions are deployable to a client system from a server system at a remote location.

17. The non-transitory, computer-readable storage medium of claim 11, wherein:
the computer executable instructions are provided by a service provider to a user on an on-demand basis.

* * * * *